Patented Mar. 6, 1934

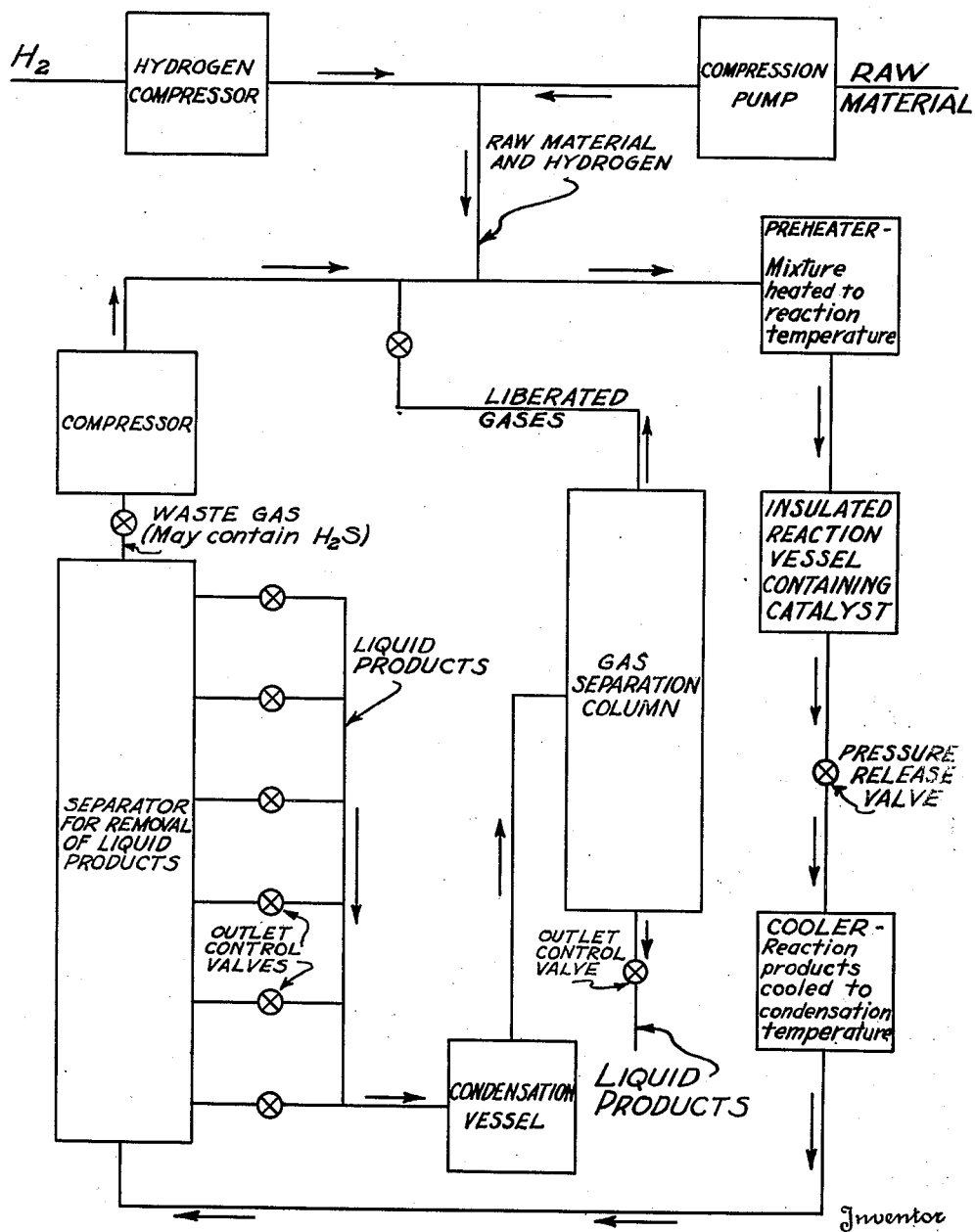

1,950,333

UNITED STATES PATENT OFFICE 1,950,333

DESTRUCTIVE HYDROGENATION OF CARBONACEOUS MATERIALS

Lajos von Szeszich, Constance, Germany

Application February 11, 1931, Serial No. 515,135
In Germany February 19, 1930

4 Claims. (Cl. 196—53)

The present invention relates to the treatment by means of hydrogen or gases containing or yielding hydrogen, of carbonaceous materials, particularly materials containing sulphur, at high temperatures and high pressures in the presence of catalysts. The starting materials are converted into valuable products which are usually liquid, by hydrogenation, reduction or splitting, and in some cases by means of more than one of such actions.

It is already known in such hydrogenation processes, to arranage for the gases resulting from the hydrogenation first to have their pressure partially released, and to employ again the gas rich in hydrogen obtained as a result, for hydrogenation purposes. In working in this way it has been recommended to subject the circulating hydrogenating gas, before returning the same into the hydrogenation vessel, to a washing process, in order to free it from hydrogen sulphide and hydrocarbons.

The present invention is based on the new experience that hydrogenation processes of the kind mentioned above may be favourably carried out catalytically by means of hydrogen sulphide if the hydrogen sulphide is employed in conjunction with one or more of a definite group of other catalysts, namely molybdenum and tungsten or molybdenum compounds such as, for example, molybdic acid and molybdates or tungsten compounds such as, for example, tungstic acid or tungstates or both molybdenum and tungsten compounds. In doing this, it is necessary so to select the amount of hydrogen sulphide employed in each case, that the desired increase in activity is obtained. The necessary amounts of hydrogen sulphide for increasing the action lie in general within the limits of 1 to 15 per cent by weight of the starting material, and preferably of 1 to 10 per cent, and frequently between 1 and 6 per cent, depending on the material hydrogenated, whether it is an oil, a tar, and so forth. The necessary amount of hydrogen sulphide in any case for producing the optimum effects may conveniently be determined for each starting material to be hydrogenated, taking into consideration the catalysts and the conditions of the reaction to be employed; for example, the temperature and pressure.

On the basis of the new discovery of the property of hydrogen sulphide in conjunction with molybdenum and tungsten compounds to act catalytically, in carrying out the hydrogenation process, according to the present invention, the proportion of hydrogen sulphide in the circulating gases is maintained such that the activity of the molybdenum or tungsten catalyst is promoted. The gaseous products coming from the hydrogenation vessel are subjected to a partial reduction in pressure, and the gases thus obtained which are rich in hydrogen, are conducted back to the hydrogenation reaction while precautions are taken that the proportion of hydrogen sulphide in the circulating hydrogenation gases is maintained such that, that hydrogen sulphide together with the hydrogen sulphide arising from the starting material which contains sulphur, promotes the efficacy of the molybdenum or tungsten catalysts. The concentration of hydrogen sulphide in the circulating hydrogenation gases may be adjusted, by correct choice of the reduced pressure, and if necessary, also by regulation of the temperature and by correct adjustment of the time of contact between gas and liquid and like precautions, to the desired amount in such a way as to maintain the proportion of hydrogen sulphide in the gases led back to the hydrogenation vessel, together with the hydrogen sulphide extracted from the starting materials, so as to produce the optimum effects.

The invention is particularly suited for continuous working at high pressures, advantageously at pressures above 100 atmospheres.

In carrying the invention into practice, the carbonaceous starting material may be hydrogenated for example by employing molybdic acid as a catalyst at pressures above 100 atmospheres at raised temperatures with hydrogen gas to which may first be added the hydrogen sulphide, and the product coming out of the hydrogenation vessel is subjected to a partial reduction in pressure. As a result, a large amount of gas is obtained, which may be referred to as the first gas and which consists substantially of hydrogen, and moreover, relatively small amounts of hydrocarbons, and finally hydrogen sulphide. If now the liquid products are further reduced in pressure to atmospheric pressure, a certain amount of gas, which may be called the second gas is obtained which contains less hydrogen, and more hydrocarbons, and moreover, also contains hydrogen sulphide.

According to one method of carrying out the invention, the second gas is withdrawn by known methods from the hydrogen sulphide, and in case the content of hydrogen sulphide in the first gas is not sufficient, the hydrogen sulphide from the second gas is mixed with the first gas in order to obtain that concentration of hydrogen sulphide in the hydrogenation vessel necessary to produce the desired effects and to maintain those effects. Moreover, the second gas can be employed for other purposes since it contains methane and its homologues as constituents in considerable amounts. It can, for example, be employed as an addition to illuminating gas.

The process is suitable for the preliminary treatment of starting materials containing different amounts of sulphur. In some cases by mixing starting materials rich in sulphur with starting materials poor in sulphur or containing no sulphur, in suitable ratios, starting materials may be produced which upon hydrogenation, yield hydrogen sulphide in such amounts that the said hydrogen sulphide together with the hydrogen sulphide returned into the hydrogenation vessel by the circulating gas, insure the production of the optimum effects.

Also starting materials poor in sulphur or containing no sulphur may be treated, with the precaution that substances yielding hydrogen sulphide, for example, sulphur itself in suitable amounts or mixed with hydrogen sulphide are added to the starting materials in suitable amounts in the hydrogenation vessel, with the result that similarly the hydrogen sulphide is circulated and care is taken that it is present continuously in the optimum amounts in the hydrogenation vessel.

The flow sheet is merely illustrative of the disclosed process and is not to be considered, in any sense, as limiting the manner in which the invention is to be carried out.

Example (a) A creosote oil of specific gravity 0.979 having a sulphur content of 0.9 per cent is hydrogenated at 200 atmospheres in the presence of a molybdenum catalyst by a continuous process in such a way that 1,500 litres of hydrogenation gas is employed for each kilogramme of oil. Since the optimal quantity of hydrogen sulphide necessary to produce the "Varga effect" is 2%, which fact is ascertained by experiments preliminary to the treatment of the creosote oil, the reaction is begun after 1% of sulphur has been added to the raw material. The products of the reaction are cooled and are first reduced in pressure to 50 atmospheres. From each kilogramme of oil employed, 1,000 litres of the first gas are evolved at 760 m. m. and 0° C., containing about 95 per cent of hydrogen and 0.6 per cent of hydrogen sulphide. This gas is compressed to 200 atmospheres and again conducted back to the hydrogenation reaction. Upon the further reduction in pressure to atmospheric pressure, 100 litres of the second gas are obtained with 69 per cent of hydrogen and 11.1 per cent of hydrogen sulphide. The second gas is separated from the hydrogen sulphide by washing with water under pressure. By releasing the pressure of the aqueous solution, the hydrogen sulphide is again set free and 5.5 litres of it, together with 500 litres of fresh hydrogen, are added to the first gas and led back to the hydrogenation reaction suitably compressed.

The reaction product obtained is a clear oil of specific gravity 0.848 which contains 48 per cent of constituents boiling up to 180° C., 0.9 per cent phenols, and no saturated hydrocarbons.

(b) If the same creosote oil is hydrogenated under the same conditions except that the first gas is not again led back to the hydrogenation reaction but that 1,500 litres of pure hydrogen are employed per kilogramme of the starting material, a hydrogenation product is obtained of specific gravity 0.887 with 5 per cent phenol, 15 per cent unsaturated hydrocarbons, and 40 per cent of constituents boiling up to 180° C.

I claim:

1. A process for the destructive hydrogenation of bituminous substances which consists in heating the material to a high temperature in the presence of a catalyst containing a substance selected from the group consisting of molybdenum and tungsten compounds, the pressure being maintained in excess of 100 atmospheres, treating the material with hydrogen under pressure, leading off the products of the reaction, cooling said products and subjecting them to a partial reduction in pressure, in order to adjust the amount of hydrogen sulphide so that when returned to the reaction the activity of said catalyst is maintained at substantially the optimum, said gas being present within the limits of 1–15%, leading off the excess gas which is rich in hydrogen, subjecting the liquid products to further reduction in pressure, thereby obtaining a gas rich in hydrocarbons and containing a substantial amount of hydrogen sulphide, withdrawing hydrogen sulphide from said last mentioned gas, adding it to said gas rich in hydrogen, the latter being then returned to the reaction, and adding a quantity of hydrogen to said returned gas sufficient to replenish that quantity which was used up in the reaction.

2. A process for the treatment of bituminous materials, which consists in heating the materials to a high temperature, the pressure being maintianed in excess of 100 atmospheres, in the presence of a catalyst chosen from the group consisting of molybdenum and tungsten compounds, treating said material with hydrogen, leading off the products of the reaction, cooling and condensing said reaction products and subjecting them to a partial reduction in pressure, then returning the excess gaseous product to the reaction, the partially reduced pressure being adjusted to that value wnich results in the optimal concentration of hydrogen sulphide, within the limits of 1–15%, in the vessel in which the reaction occurs during all stages of the process, thereby increasing the activity of the catalysts, and adding to the excess gaseous product which is returned to the reaction a quantity of hydrogen sufficient to replenish that amount which was used up in the reaction.

3. A process as set forth in claim 2 in which the reduced pressure and the temperature of condensation is so determined that the optimal quantity of hydrogen sulphide is maintained in the reaction vessel as a result of the return of the gaseous product to the reaction.

4. A process as set forth in claim 2 in which the reduced pressure, the temperature of condensation, and the time of contact between the gaseous part of the reaction product and the liquid part of the reaction product are so determined that the optimal quantity of hydrogen sulphide is maintained in the reaction vessel as a result of the return of the gaseous product to the reaction.

LAJOS von SZESZICH.